July 21, 1959

E. D. RATTIGAN 2,895,709

GATE VALVE

Filed March 22, 1955

INVENTOR.
EDWIN D. RATTIGAN
BY
*Sidney W Frick*
ATTORNEY

July 21, 1959   E. D. RATTIGAN   2,895,709
GATE VALVE
Filed March 22, 1955   2 Sheets-Sheet 2

INVENTOR.
EDWIN D. RATTIGAN
BY
Sidney W. Frick
ATTORNEY

United States Patent Office 2,895,709
Patented July 21, 1959

2,895,709

GATE VALVE

Edwin D. Rattigan, Chalfont, Pa.; A. Frieda Rattigan, administratrix of the estate of Edwin D. Rattigan, deceased Application March 22, 1955, Serial No. 495,990

5 Claims. (Cl. 251—167)

This invention relates to fluid control devices, and particularly to gate type valves and associated operating mechanisms. One of its main objectives is the provision of a valve disc and seat having positive leakproof mating characteristics, and, in conjunction therewith, an equally positive mechanism which will insure effective and substantially frictionless operation.

Among the advantages of this inventive device are simplicity of manufacture, due in part to relative tolerance latitude, low wear, continued operability in spite of wear, and its great flexibility and adaptability for use with desired types of operating shafts and sealing arrangements.

The foregoing, together with other objectives and advantages of the invention, will become apparent from the following detailed description and explanation, utilizing the accompanying drawings, in which.

Figure 1:
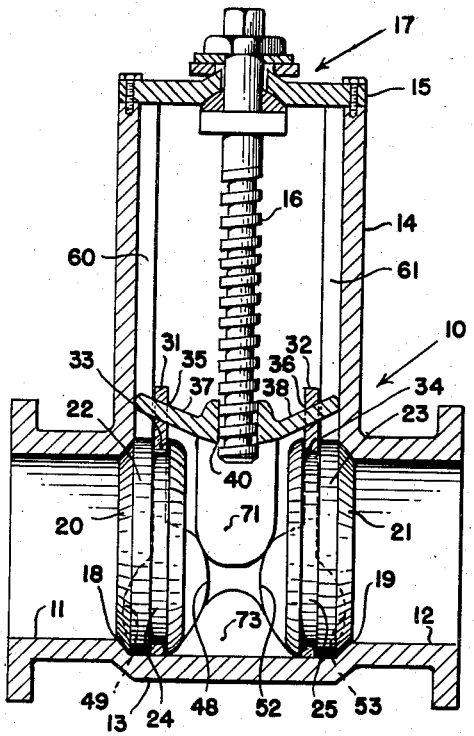
Figure 1 represents an elevational view of a dual gate valve assembly, partly in cross-section, constructed in accordance with the present invention and showing the valve discs or gates in closed position.

The valve assembly illustrated herein includes a casing 10, having inlet and outlet flow ports 11 and 12, valve chamber 13 therebetween with a rectangular internal cross-section, and similarly cross-sectioned operating shaft chamber 14 extending away from said valve chamber normally of the flow line. Bonnet 15 encloses the open end of the operating shaft chamber 14, and externally threaded operating shaft 16 extends therethrough into chamber 14. Any suitable means for assembling and sealing the operating shaft into the casing may be selected. Illustratively here a nonrising operating shaft has been chosen and the assembly and flexible packless sealing means set forth in my copending application Serial Number 486,150, filed February 4, 1955, which is a continuation-in-part of my copending application Serial Number 365,946, filed July 3, 1953, now abandoned, is shown at 17.

Valve chamber 13 contains circularly cross-sectioned beveled valve disc seats 18 and 19 across flow ports 11 and 12 respectively, and the beveled faces 20 and 21 of circularly cross-sectioned valve discs 22 and 23 mate therewith, respectively, in the closed position shown in Figure 1.

Ringing valve discs 22 and 23 are grooves 24 and 25, respectively, formed by local reduction of diameters of the discs as shown. Yokes 31 and 32, each comprising two complementary half sections, as most clearly shown in Figure 3, and having a thickness slightly less than the width of grooves 24 and 25, are cut away centrally thereof to form holes 33 and 34 slightly greater in diameter than the diameter of valve disc grooves 24 and 25, being thus respectively adapted for assembly with discs 22 and 23 by fitting with slight clearance within grooves 24 and 25, as also most clearly indicated in the exploded view of Figure 3.

Figure 2:
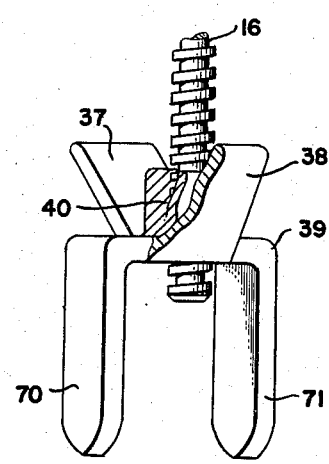
Figures 2 and 3 are enlarged perspective views, the latter partially exploded, of details of the operating mechanism of the valve of Figure 1, showing construction and manner of assembly.

Above holes 33 and 34 in yokes 31 and 32 are slots 35 and 36, through which are assembled respectively, also with slight clearance, horns 37 and 38 of horn and wedge unit 39, this unit being shown in detail in Figure 2. Horn and wedge unit 39 is internaly threaded at 40 to mate with externally threaded operating shaft 16 and is screw-assembled thereto so as to move axially thereof upon rotation of the shaft. Horns 37 and 38 are disposed angularly upward, the reason for which will appear more fully below.

Figure 4:
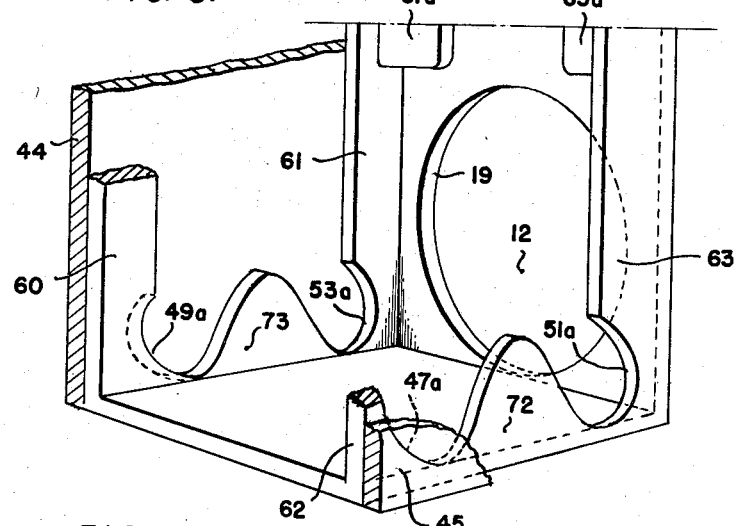
Figure 4 is an enlarged cutaway perspective view of a portion of a liner for assembly within the casing of the valve of Figure 1, showing contoured wall sections which comprise part of the operating mechanism.

Each of yokes 31 and 32 has a width equivalent, except for slight clearance, to the distance between the internal surfaces of valve casing walls 44 and 45, best indicated in Figure 4. The thickness of the lower portions of the edges of each yoke is increased to form planar surfaces parallel, in assembly, to the internal surfaces of walls 44 and 45 and containing contoured projections 46 and 47, 48 and 49, 50 and 51, and 52 and 53 (projections 46 and 47 on yoke 31 not appearing in the figures due to choice of views but corresponding respectively to projections 52 and 53 of yoke 32).

Figure 3:
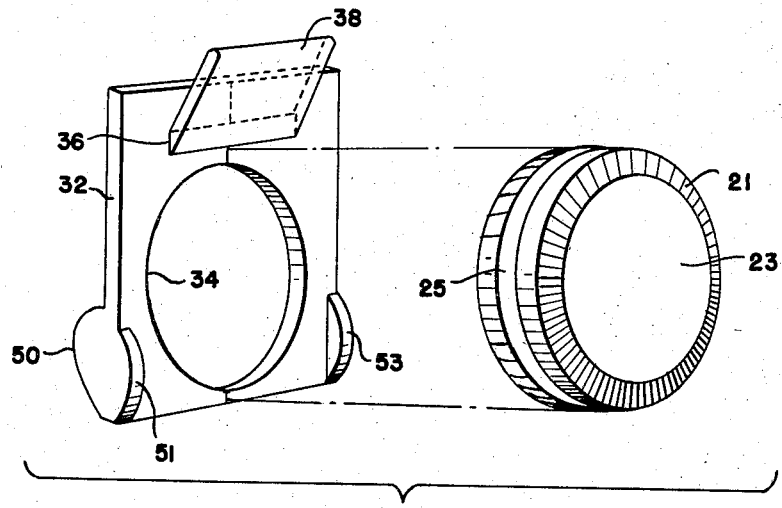

Guide rails 60 and 61, and 62 and 63, affixed to the internal surfaces of walls 44 and 45, respectively, run the length of operating shaft chamber 14, and extend through valve chamber 13, where they are cut away to form contoured recesses 49a and 53a, and 47a and 51a, respectively, as best shown in Figure 4 where they are illustrated as components of a liner that may be separately fabricated and assembled within the valve casing. Recesses 49a and 53a are contoured to mate with contoured projections 49 and 53 of yokes 31 and 32, respectively, and recesses 47a and 51a are similarly contoured to mate with contoured projections 47 and 51 of yokes 31 and 32, respectively, when the valve discs are in closed position as shown in Figure 1. Horns 37 and 38 may have a width equivalent to the distance between the inner surfaces of guide rails 60 and 62, and 61 and 63, respectively, except for slight clearance, and a length similarly corresponding to the distance between the inner surfaces of the opposite pair of operating shaft chamber walls facing each other, guide paths for the horns being thereby defined. Alternatively, as shown in Figures 2, 3, and 4, the width of the horns may be reduced so that the width of slots 35 and 36 can be reduced to improve the structural integrity of the yokes, and supplemental guide rails 60a and 62a, and 61a and 63a (only rails 61a and 63a being indicated in Figure 4) may be added to provide desired guide paths.

Horn and wedge unit 39 provides wedges 70 and 71 extending downward, oppositely from horns 37 and 38, and parallel to each other, and in assembly to walls 44 and 45, being separated from each other by a distance equivalent to the distance between said walls, except for slight clearance. In assembly, it will be seen that wedge 70 coacts with contoured projections 46 and 50 of yokes 31 and 32, and that wedge 71 coacts with contoured projections 48 and 52 of yokes 31 and 32. Contoured guide projections 72 and 73 of yokes are affixed at the bottoms of the internal surfaces of walls 44 and 45, respectively, best shown in Figure 4 where they are also illustrated as components of a liner that may be separately fabricated and assembled within the valve casing, and will be seen to pair off with wedges 70 and 71 respectively, in coacting with the aforesaid contoured projections of yokes 31 and 32. The manner of this coaction will appear more clearly from the following explanation of the operation of this valve assembly.

The closed position of the valve assembly, depicted in Figure 1, shows beveled faces 20 and 21 of valve discs 22 and 23 tightly seated in their respective seats 18 and 19. Horn and wedge unit 39 is at its lowest position on operating shaft 16, which position is achieved conventionally by rotation of the shaft in closing direction. In this position yokes 31 and 32 are forced downwardly and outwardly away from each other by the action of horns 37 and 38 in slots 35 and 36, combined with the wedging and guiding action of wedges 70 and 71 and guide projections 72 and 73 against yoke contoured projections 46 and 50, and 48 and 52, the downward force of horns 37 and 38 together with their angularly upward dispositions causing the yokes to move not only downwardly but also outwardly along the lengths of their respective horns. Correspondingly valve discs 22 and 23, being carried by yokes 31 and 32, are thereby held tight against their seats, being positively positioned by the mating of contoured projections 47 and 49, and 51 and 53, with their respective recesses 47a and 49a, and 51a and 53a. The previously noted clearances in the fit of yokes 31 and 32 within grooves 24 and 25 of discs 22 and 23, as well as other clearances in assembly of the operating mechanism provide relative freedom for the discs to independently seek the firmest and most intimate mating contact with their respective seats 18 and 19.

Figure 5:
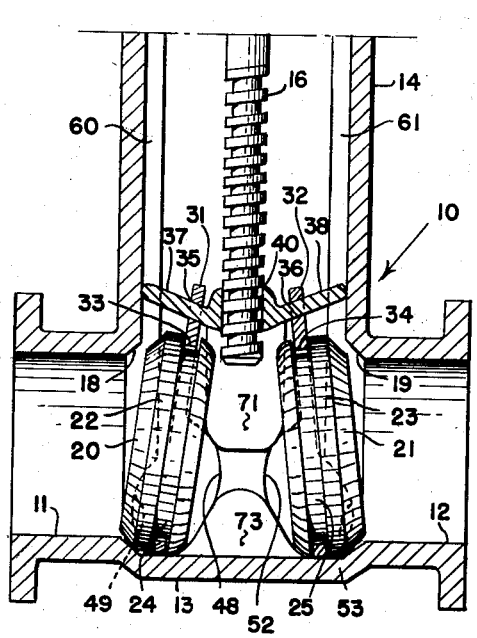
Figures 5 and 6 are companion figures to Figure 1, showing the valve discs or gates in partially open position and in completely open position, respectively.

The opening of the valve, depicted in its initial stage in Figure 5, illustrates an important feature of the invention in making evident the modified butterfly valve action of the valve discs. As the operating shaft is turned in the opening direction, the horn and wedge unit rises axially of the shaft exerting an upward force on the yoke and disc assemblies, which first manifests itself in a movement of the upper portions of the yokes inwardly along their respective horns, this motion being also due to the angular upward disposition of the horns. As the upper portions of the yokes move inwardly their lower projections rotate within their respective recesses. Consequently all portions of the valve discs are broken away from their seats simultaneously, the lower portions of the discs arcing slightly toward their respective flow ports and the upper portions of the discs arcing away from their respective flow ports and inwardly of the valve chamber. This motion is facilitated by the pressure of the fluid being controlled and results in the clearing of the beveled faces of the discs from their seats so that the discs can move upward as the opening operation continues. The opening action as described provides initial leakage to relieve suction, which would otherwise tend to keep the downstream valve disc in its seat, by utilizing a degree of pressure at the lower portion of that disc. It will be evident also that the motion insures the separation of the valve discs from their seats without appreciable cross friction. This modified butterfly valve action or cocking movement is further assured by the constraining interaction of the mating contoured surfaces of the yokes, wedges, guides, and recesses, and the best possible opening action in any particular application is dependent upon proper contouring of these surfaces and upon proper choice of the distance between the beveled face and the groove on each disc. This distance coupled with the contour of projections 51 and 53, and 47 and 49, and their mating recesses, determine the arc path of the lower portion of the discs. In the opening movement wedges 70 and 71 will be seen to rise, allowing other mating surfaces to move against each other in manner dictated by the contour shapes. The contours as well as the angle of the upward disposition of the horns are selected so as to insure sufficient inward movement of the upper portions of the valve discs to clear their seats before their lower portions move inwardly away from the seats. This is the position specifically illustrated in Figure 5.

Figure 6:
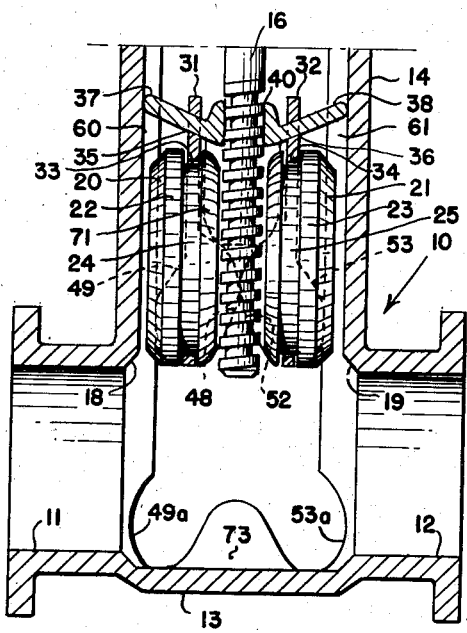

Once the position shown in Figure 5 is attained, further rotation of the operating shaft in the opening direction results in movement of the lower portions of the valve discs inwardly and upwardly as dictated by the shapes of the various contoured surfaces and as permitted by the rising of the wedges, until finally the discs are again parallel to each other in inward position and are raised together with their yokes completely into the operating shaft chamber clearing the fluid flow passage completely so as to offer no resistance to the flow, as clearly shown in Figure 6. The closing action, achieved simply by rotation of the operating shaft in the opposite direction, merely reverses the action outlined above, with the moving parts once again returning first to the position of Figure 5 and finally to the tightly and positively closed position of Figure 1.

The words "above," "below," "upward," "downwardly," "upper," "lower," and the like, used above, are of course relative terms. The valve assembly of this invention is operable in any position.

The advantages derived from the use of valve discs with beveled faces and beveled valve seats are largely self-evident, including tighter, more positive and intimate seating, with solid surface contact between mating elements rather than single planar contact therebetween, automatic adjustment of seating surfaces to compensate for such wear as may eventuate, etc. The advantages of the operating mechanism, in addition to enabling the use of said beveled faces and seats, will likewise readily occur, providing as it does positive closing, opening facilitated by internal pressures and minimal frictional forces and hence reducing the required operating effort to a minimum, operation reducing to a minimum wear caused in previously used valves by repeated sliding of mating surfaces over one another, simplified manufacture, due in part to the appreciable tolerances permissible in various of the detail parts, etc.

It will of course be apparent that the inventive concept herein illustrated in a dual gate valve embodiment can be readily applied to a single gate valve structure as well as to other types of structure, that the operating mechanism can be also utilized to great advantage in valve arrangements not making use of beveled valve disc faces and seats, and with rising as well as nonrising operating shafts, etc. Accordingly, while one embodiment has been fully illustrated and described herein, the invention is not confined thereto. Many modifications in addition to those suggested, as well as other variations, arrangements, combinations, adaptations and uses thereof will occur and it must be understood that all such modifications, etc., are equally within the scope and contemplation of this invention, the specification, and the appended claims.

Having thus described my invention, I claim:

1. A valve assembly having a casing with inlet and outlet flow ports, a valve chamber therebetween and an operating shaft chamber connecting with said valve chamber, a liner assembled within said casing and having guide rails, contoured recesses and contoured guide projections, beveled valve seats across said flow ports and valve discs with beveled faces for mating with said seats, an operating shaft and a horn and wedge unit assembled thereto so as to move axially of the operating shaft chamber upon rotation of said shaft, said horn and wedge unit having horns with angularly upward disposition and wedges extending downward, said valve discs having grooves annularly thereof and yokes assembled within said grooves, the upper portions of said yokes having slots cut therethrough with the horns of said horn and wedge unit extending therethrough so that said yokes are free to slide relative thereto, the lower portions of said yokes having contoured projections adapted to mate with the contoured recesses of said liner and having contoured projections adapted to coact with the wedges of the horn and wedge unit and the contoured guide projections of said liner, the guide rails of said liner forming guide paths for said horn and wedge unit, said assembly being so arranged to impart to the valve discs a modified butterfly action with respect to their seats in operation and to impart a positive seating force to said discs in closing of the valve.

2. A duel gate valve assembly having a casing with inlet and outlet flow ports, a valve chamber therebetween and an operating shaft chamber connecting with said valve chamber, guide rails having contoured recesses affixed internally of said casing, contoured guide projections affixed internally of said casing, recessed valve seats across said flow ports and valve gates with matching projecting faces for solid surface mating therewith, an operating shaft and a horn and wedge unit assembled thereto so as to move axially of the operating shaft chamber upon rotation of said shaft, said horn and wedge unit having horns with angularly upward disposition and wedges extending downward, said valve gates having grooves annularly thereof and yokes assembled within said grooves, the upper portions of said yokes having slots cut therethrough with the horns of said horn and wedge unit extending therethrough so that said yokes are free to slide relative to said horns, the lower portions of said yokes having contoured projections adapted to mate with the contoured recesses of said guide rails and having contoured projections adapted to coact with the wedges of the horn and wedge unit and said contoured guide projections.

3. A valve assembly having a casing with inlet and outlet flow ports, a valve chamber therebetween and an operating shaft chamber connecting with said valve chamber, guide rails having contoured recesses affixed internally of said casing, contoured guide projections affixed internally of said casing, valve seats across said flow ports and valve gates for mating therewith, an operating shaft and a horn and wedge unit assembled thereto so as to move axially of the operating shaft chamber upon rotation of said shaft, said horn and wedge unit having horns with angularly upward disposition and wedges extending downward, said valve gates incorporating portions with slots therethrough and being assembled to said horn and wedge unit by means of said horns extending through said slots, said valve gates also incorporating portions having contoured projections adapted to mate with the contoured recesses of said guide rails and having contoured projections adapted to coact with the wedges of the horn and wedge unit and said contoured guide projections.

4. A gate valve assembly having a casing with inlet and outlet flow ports, a valve chamber therebetween and an operating shaft chamber connecting with said valve chamber, a guide rail having a contoured recess affixed internally of said casing, a valve seat across a flow port and a valve gate for mating therewith, an operating shaft and a unit assembled thereto so as to move axially of the operating shaft chamber upon rotation of said shaft and having a horn extending outwardly from the shaft and a wedge extending toward the valve chamber, said gate having a groove annularly thereof and a yoke assembled within said groove with slight clearance so as to permit limited movement of the gate relative to the yoke, a portion of the yoke having a slot cut therethrough with the said horn extending through the slot so that the yoke has limited freedom to slide relative to the horn, a portion of the yoke having a contoured projection adapted to mate with the contoured recess of said guide rail and having a contoured projection adapted to coact with said wedge, the horn, wedge, and contoured recess and projections being selected so as to provide desired constrained movement of the gate relative to its seat upon rotation of the shaft.

5. In a valve assembly having a flow path, a valve seat across said flow path, a valve disc for mating therewith and an operating shaft extending angularly of said flow path, means for providing selected constrained motion to the valve disc relative to its seat by rotation of the operating shaft including a unit assembled to the operating shaft so as to move parallel to the shaft axis upon rotation of the shaft and having a horn extending outwardly from the shaft and angularly away from the flow path, said valve disc being slidably assembled to said horn, a contoured guide projection affixed internally of the valve assembly and a projection assembled to the valve disc for mating therewith, said projections being respectively contoured to provide a pair of interacting surfaces forcing positive constrained motion of the valve disc longitudinally of the flow path toward the valve seat as rotation of the shaft in closing direction moves the disc transversely of the flow path into the flow path, a guide rail having a recess affixed internally of the valve assembly and a second projection assembled to the valve disc for mating therewith, said recess and said projection being respectively contoured to provide a second pair of interacting surfaces forcing positive constrained motion of the valve disc longitudinally of the flow path away from the valve seat as rotation of the shaft in opening direction moves the disc transversely of the flow path out of the flow path.

References Cited in the file of this patent
UNITED STATES PATENTS

| | | |
|---|---|---|
| 233,180 | Allt | Oct. 12, 1880 |
| 291,479 | Hughes | Jan. 1, 1884 |
| 340,371 | Scott | Apr. 20, 1886 |
| 600,181 | Smith | Mar. 8, 1898 |
| 653,600 | Wiley | July 10, 1900 |
| 681,285 | Whener | Aug. 27, 1901 |
| 724,887 | Knickerbacker | Apr. 7, 1903 |
| 856,546 | Pfeil | June 11, 1907 |
| 948,359 | Watson | Feb. 8, 1910 |
| 1,999,155 | Karnath | Apr. 23, 1935 |
| 2,073,727 | Bodnovich | Mar. 16, 1937 |
| 2,198,639 | Stines | Apr. 30, 1940 |